(12) United States Patent
Kusaka et al.

(10) Patent No.: US 7,765,606 B2
(45) Date of Patent: Jul. 27, 2010

(54) SCANNING PROBE APPARATUS

(75) Inventors: Takao Kusaka, Yokohama (JP); Nobuki Yoshimatsu, Kawasaki (JP); Susumu Yasuda, Tsukuba (JP); Junichi Seki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 307 days.

(21) Appl. No.: 11/627,845

(22) Filed: Jan. 26, 2007

(65) Prior Publication Data

US 2007/0187594 A1 Aug. 16, 2007

(30) Foreign Application Priority Data

Feb. 1, 2006 (JP) .............. 2006-024712

(51) Int. Cl.
*G01N 23/00* (2006.01)
(52) U.S. Cl. .............. 850/54; 850/1; 850/18; 850/52; 850/53; 250/306; 250/307; 250/442.11; 250/423 F; 369/126; 310/328; 73/105
(58) Field of Classification Search .......... 250/306, 250/307, 442.11, 423 F; 310/328, 323; 369/126; 73/105; 850/1, 18, 52, 53, 54
See application file for complete search history.

(56) References Cited

U.S. PATENT DOCUMENTS

| | | | | |
|---|---|---|---|---|
| 5,153,494 | A * | 10/1992 | Hollis, Jr. | 318/640 |
| 5,173,605 | A * | 12/1992 | Hayes et al. | 850/1 |
| 5,200,617 | A * | 4/1993 | Hayes et al. | 850/1 |
| 5,296,704 | A * | 3/1994 | Mishima et al. | 850/6 |
| 5,751,684 | A | 5/1998 | Takeda et al. | |
| 5,753,911 | A | 5/1998 | Yasuda et al. | |
| 5,831,961 | A * | 11/1998 | Sakai et al. | 369/126 |
| 6,025,671 | A * | 2/2000 | Boecking | 310/369 |
| 6,127,682 | A * | 10/2000 | Nakamoto | 850/33 |
| 6,195,313 | B1 | 2/2001 | Seki et al. | |
| 6,323,483 | B1 | 11/2001 | Cleveland et al. | |
| 6,459,088 | B1 * | 10/2002 | Yasuda et al. | 250/442.11 |
| 6,806,991 | B1 * | 10/2004 | Sarkar et al. | 359/290 |

(Continued)

FOREIGN PATENT DOCUMENTS

JP 2000-088983 3/2000

(Continued)

OTHER PUBLICATIONS

U.S. Appl. No. 11/797,116 (Kusaka), filed May 1, 2007.

(Continued)

*Primary Examiner*—Bernard E Souw
*Assistant Examiner*—Michael J Logie
(74) *Attorney, Agent, or Firm*—Fitzpatrick, Cella, Harper & Scinto

(57) ABSTRACT

A scanning probe apparatus for obtaining information of a sample, recording information in the sample, or processing the sample with relative movement between the sample and the apparatus, the apparatus is constituted by a probe; and a scanning stage including a drive element for moving a sample holding table for holding the sample and a movable portion movable in a direction in which an inertial force generated during movement of the sample holding table is cancelled. The scanning stage further includes a memory for storing characteristic information of the scanning stage and is detachably or replaceably mountable to a main assembly of the apparatus.

7 Claims, 6 Drawing Sheets

U.S. PATENT DOCUMENTS

| | | | |
|---|---|---|---|
| 6,831,765 B2 | 12/2004 | Yasuda et al. | |
| 6,949,844 B2 * | 9/2005 | Cahill et al. | 310/12 |
| 6,965,239 B2 | 11/2005 | Yasuda et al. | |
| 7,173,747 B2 | 2/2007 | Yasuda et al. | |
| 7,212,007 B2 | 5/2007 | Yasuda et al. | |
| 7,277,214 B2 | 10/2007 | Yasuda et al. | |
| 7,288,762 B2 * | 10/2007 | Iyoki et al. | 250/306 |
| 7,319,528 B2 * | 1/2008 | Hidaka | 356/600 |
| 2006/0081040 A1 * | 4/2006 | Yamamoto | 73/105 |
| 2006/0192565 A1 | 8/2006 | Yasuda et al. | |
| 2007/0187593 A1 | 8/2007 | Yasuda et al. | |
| 2007/0187594 A1 * | 8/2007 | Kusaka et al. | 250/306 |
| 2008/0315092 A1 * | 12/2008 | Kley | 250/307 |

FOREIGN PATENT DOCUMENTS

| | | | |
|---|---|---|---|
| JP | 2000088983 | | 3/2000 |
| JP | 2002-082036 | | 3/2002 |
| JP | 2002082036 | | 3/2002 |
| JP | 2003-0140053 | | 5/2003 |
| JP | 2003140053 | | 5/2003 |
| JP | 2005233669 | A * | 9/2005 |
| JP | 2005233669 | A * | 9/2005 |
| WO | 97/34122 | | 9/1997 |
| WO | 9734122 | | 9/1997 |

OTHER PUBLICATIONS

U.S. Appl. No. 11/747,581 (Yasuda et al.), filed May 11, 2007.

* cited by examiner

SCANNING PROBE APPARATUS

FIELD OF THE INVENTION AND RELATED ART

The present invention relates to a scanning probe apparatus ordinarily utilizing a scanning probe microscope (SPM).

Particularly, the present invention relates to a scanning probe apparatus for obtaining information of a sample, recording information in the sample, or processing the sample with relative movement between a probe and the sample.

In recent years, a scanning tunneling microscope (STM) capable of observing a surface of an electroconductive substance with resolution of nanometer or below has been developed. Further, an atomic force microscope (AFM) or the like capable of observing a surface of an insulating substance or the like with resolution similar to that of the STM has also been developed.

As a further developed type thereof, a scanning near-field optical microscope (SNOM) or the like for observing a surface state of a sample by utilizing evanescent light leaking from a minute opening at a sharp tip of a probe has been developed. In addition, a (scanning) magnetic force microscope (MFM), a scanning capacitance microscope (SCaM), a scanning thermal microscope (SThM), and the like have also been developed.

As described above, microscopes capable of measuring various physical amounts at the surfaces of the above described samples with high resolution by effecting scanning with respect to a probe or a sample have been currently developed. These microscopes are inclusively referred to as a scanning probe microscope (SPM).

In this SPM, in order to achieve high-accuracy control, suppression of an occurrence of vibration caused by a scanning operation is required.

Japanese Laid-Open Patent Application (JP-A) No. 2002-082036 has proposed a scanning mechanism for an SPM capable of suppressing an occurrence of a vibration caused by a scanning operation to permit high-accuracy position control at high speed.

More specifically, e.g., as shown in FIG. 5, a scanning mechanism 700 includes bases 701 and 702 for drive elements (actuators), drive element holding member 706 and 707 provided on the bases, a drive element 703 held by these holding members and capable of expanding and contracting in Y direction, a drive element 704 fixed at one end of the drive element 703 and capable of expanding and contracting in X direction, a drive element 705 fixed at one end of the drive element 704 and capable of expanding and contracting in Z direction, and a sample holding member 708 provided on one end of the drive element 705. The drive element 705 is connected to the drive element 704 in its center or the neighborhood of the center. The drive element 704 is connected to the drive element 703 in its center or the neighborhood of the center. The drive element 703 is held by the holding members 706 and 707 in its center or the neighborhood of the center.

JP-A No. 2000-088983 has proposed an SPM which includes a small-size and lightweight drive stage causing less occurrence of vibration even when driven at high speed and is capable of obtaining a clear image at high speed.

More specifically, a drive stage is constituted by a supporting member, two or more movable portions supported by the supporting member, and one or more drive element for driving the two or more movable portions. This drive stage is constituted so that the movable portions are driven in a direction in which inertial forces generated in the movable portions are mutually cancelled during the drive of the drive elements.

More specifically, as shown in FIG. 6(a), the drive stage has such a structure that two cylindrical piezoelectric elements are concentrically disposed. More specifically, inside a first cylindrical piezoelectric element 800, a second cylindrical piezoelectric element 810 is concentrically disposed. This state is shown in FIG. 6(a) as an exploded view. Around the first cylindrical piezoelectric element 800, divided four electrodes 801 to 804 are disposed, and at an upper portion of the first cylindrical piezoelectric element 800, a sample holding table 805 is connected. Further, around the second cylindrical piezoelectric element 810, divided four electrodes 811 to 814 are disposed, and at an upper portion of the second cylindrical piezoelectric element 810, a weight 815 is connected. The first and second cylindrical piezoelectric elements 800 and 810 can be bent by controlling voltages applied to opposite two electrodes (801 and 803, 802 and 804, 811 and 813, or 812 and 814) so that one of the two electrodes is expanded and the other electrode is contracted. Further, it is also possible to expand and contrast each of the cylindrical piezoelectric elements in a long axis direction by applying the same voltage to the divided four electrodes. In short, the bending and the expansion and contraction of the cylindrical piezoelectric elements 800 and 810 can be controlled by voltages.

As a result, it is possible to three-dimensionally drive the sample holding table (movable table) 805 and the weight 815 disposed at the upper (top) portions of the cylindrical piezoelectric elements.

FIG. 6(b) is a wiring diagram for the drive stage in this embodiment.

By effecting wiring as shown in FIG. 6(b), the outer cylindrical piezoelectric element 800 and the inner cylindrical piezoelectric element 810 are always driven in mutually opposite directions. A behavior of deformation of the cylindrical piezoelectric elements in shown in FIG. 6(c) as a schematic sectional view. In FIG. 6(c), the cylindrical piezoelectric element 800 is bent and expanded toward an upper left direction, and the cylindrical piezoelectric element 810 is bent and contracted toward a lower right direction. Gains (amplification factors) $-Ax$, $-Ay$, and $-Az$ of amplifiers 820, 821 and 822 are set to cancel inertial forces with respect to the cylindrical piezoelectric elements 800 and 810 in X, Y and Z directions, respectively. Further, these gains may desirably be adjusted to optimum values when a weight of an object to be placed on a moving table.

In this embodiment constituted as described above, the drive stage is always driven so that inertial forces generated with respect to the outer first cylindrical piezoelectric element 800 and the inner second cylindrical piezoelectric element 810 are cancelled. As a result, it is possible to provide a stage causing less vibration even when the sample holding table is driven at high speed.

Incidentally, in the SPM, a size of apparatus varies depending on a size of a sample to be observed and information to be observed. For example, in a case of small sample having a narrow field of view (scanning range), a small drive stage is used. Further, in a case of a wide scanning range, a large drive stage is used.

On the other hand, with respect to the probe, in the case of the AFM, the same probe can be used. For this reason, the scanning stage is removed from a main assembly and another scanning stage is mounted to the main assembly in some cases. In other words, only the scanning stage can be replaced.

In this case, however, when a scanning stage including the above described movable portions (counterweight, balance weight) for cancelling inertial force is used, the following problem is caused to occur.

When only the scanning stage is replaced while leaving the movable portions as they are, a balance relationship with the counterweight cannot be maintained, so that a desired cancellation of inertial force cannot be effected in some cases. Particularly, in the case where an electromechanical transducer such as a piezoelectric element is used as a drive element (actuator) for driving the scanning stage or the counterweight, an operation performance of the drive element is changed with time by the use of the drive element.

For this reason, when the SPM is continuously used by replacing only the scanning stage, such a phenomenon that deterioration of the drive element for the counterweight occurs and on the other hand, the scanning stage is refreshed by replacement is caused to occur.

As a result, an amount of displacement with respect to an applied voltage is different between the drive element for the counterweight and the drive element for the scanning stage, so that it is further difficult to cancel the inertial force generated with respect to the scanning stage. Further, a characteristic, of the drive element for the scanning stage, such as an amount of displacement exhibits hysteresis in many cases and varies for each of the drive elements.

In view of the above described circumstances, in order to drive the scanning stage so as to effect a desired cancellation of inertial force, an operator is required to make correction every replacement of the scanning stage. As a result, the scanning probe apparatus requires expense in time and effort such that the operator makes correction so that the inertial force generated with respect to the scanning stage is properly cancelled every time the scanning stage is replaced.

SUMMARY OF THE INVENTION

A principal object of the present invention is to provide a scanning probe apparatus capable of properly cancelling inertial force generated with respect to a scanning stage and a drive stage without requiring expense in time and effort such that an operator makes correction every time the scanning stage or the drive stage is replaced.

According to an aspect of the present invention, there is provided a scanning probe apparatus for obtaining information of a sample, recording information in the sample, or processing the sample with relative movement between the sample and the apparatus, the apparatus comprising:

a probe; and a scanning stage comprising a drive element for moving a sample holding table for holding the sample and a movable portion movable in a direction in which an inertial force generated during movement of the sample holding table is cancelled, wherein the scanning stage further comprises a memory for storing characteristic information of the scanning stage and is detachably or replaceably mountable to a main assembly of the apparatus.

In a preferred embodiment, the scanning stage is constituted so that the sample holding table, the drive element, and the movable portion are detachably or replaceably mountable integrally to the main assembly of the apparatus. Further, the apparatus may further preferably comprise communication means, on its main assembly side, for receiving the information stored in the memory in a noncontact manner, and wherein drive of the scanning stage is controlled on the basis of the information received by the communication means. Each of the drive element and the movable portion may preferably comprise an electromechanical transducer. The electromechanical transducer may preferably comprise a first cylindrical piezoelectric element constituting the drive element and a second cylindrical piezoelectric element which constitutes the movable portion and is disposed inside the first cylindrical piezoelectric element.

According to another aspect of the present invention, there is provided a scanning probe apparatus for obtaining information of a sample, recording information in the sample, or processing the sample with relative movement between the sample and the apparatus, the apparatus comprising:

a probe drive stage comprising a drive element for moving a probe holding table and a movable portion movable in a direction in which an inertial force generated during movement of the probe holding table is cancelled; and a scanning stage for holding a sample, wherein the probe drive stage further comprises a memory for storing characteristic information of the probe drive stage and is detachably or replaceably mountable to a main assembly of the apparatus.

In a preferred embodiment, the probe drive stage is constituted so that the probe holding table, the drive element, and the movable portion are detachably or replaceably mountable integrally to the main assembly of the apparatus. Further, the apparatus may further preferably comprise communication means, on its main assembly side, for receiving the information stored in the memory in a noncontact manner, and wherein drive of the scanning stage is controlled on the basis of the information received by the communication means. Each of the drive element and the movable portion comprises an electromechanical transducer. The electromechanical transducer comprises a first cylindrical piezoelectric element constituting the drive element and a second cylindrical piezoelectric element which constitutes the movable portion and is disposed inside the first cylindrical piezoelectric element.

In a preferred embodiment, any one of the above described scanning probe apparatuses may preferably include a probe drive stage for driving a probe and a scanning stage for holding a sample, wherein the probe drive stage is any one of the above described probe drive stage and the scanning stage is any one of the above described scanning stages.

According to a further aspect of the present invention, there is provided a stage for a scanning probe apparatus for obtaining information of a sample, recording information in the sample, or processing the sample with relative movement between the sample and the apparatus, the stage comprising:

a drive element for moving a probe or a sample holding table for holding the sample and a movable portion movable in a direction in which an inertial force generated during movement of the probe or the sample holding table is cancelled, wherein the stage further comprises a memory for storing characteristic information of the stage and is detachably or replaceably mountable to a main assembly of the apparatus.

According to the present invention, it is possible to provide a scanning probe apparatus capable of properly cancelling inertial force generated with respect to a scanning stage and a drive stage while alleviating expense in time and effort such that an operator makes correction every time the scanning stage or the drive stage is replaced.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
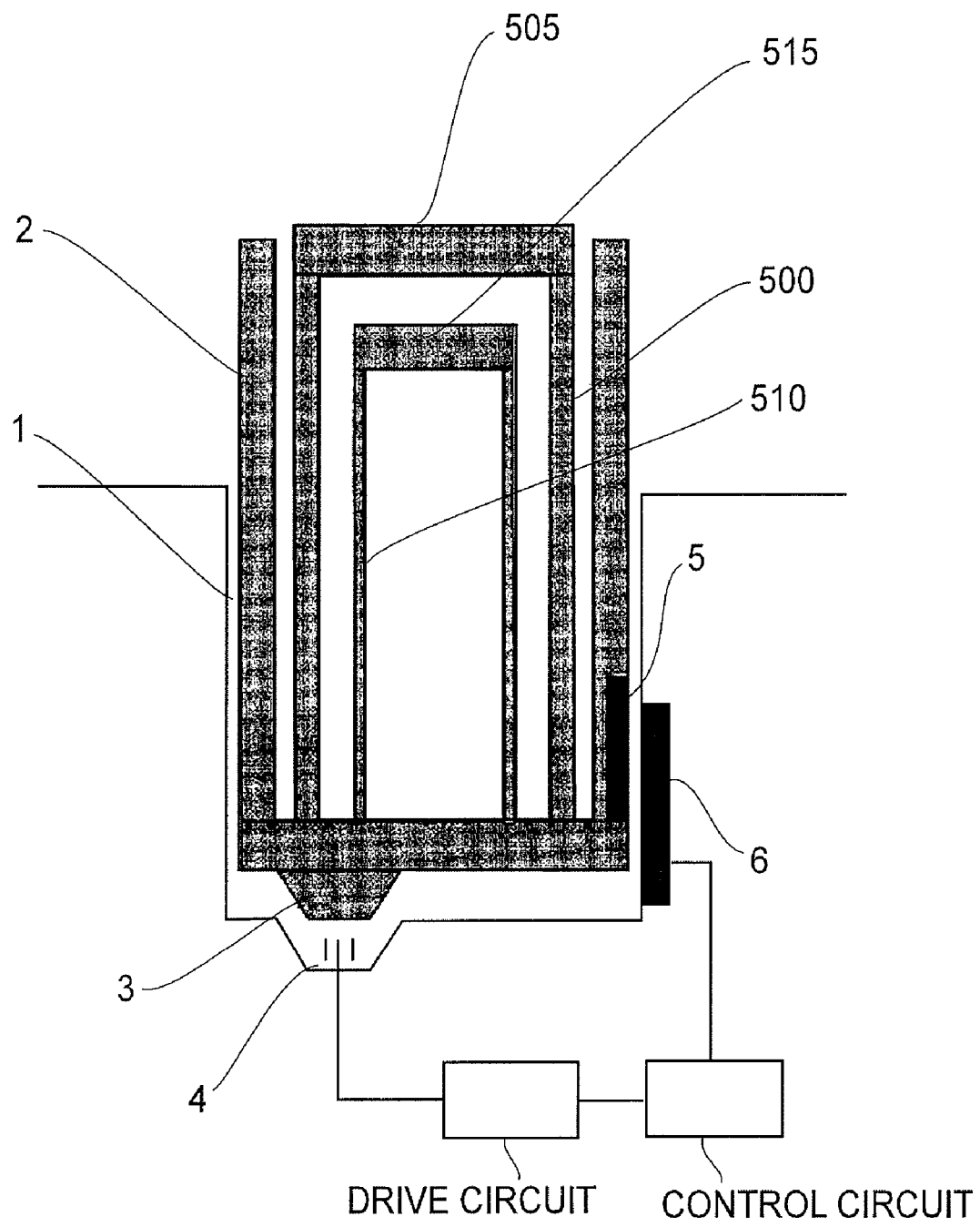
FIG. 1 is a schematic sectional view showing a scanning stage replaceable with respect to a main assembly of a scanning probe apparatus in Embodiment 1 of the present invention.

According to a constitution of the present invention, it is possible to perform calibration of a scanning stage automatically on the basis of characteristic information and usage history information without causing, e.g., the above described problem of a conventional case where only a scanning piezoelectric element is replaced. As a result, even when a scanning probe apparatus is repetitively used, it is possible to always cancel the inertial force effectively to suppress vibration. Particularly, as described below, the scanning probe apparatus according to the present invention effectively meets demands for scanning in Z direction in which movement is effected at a highest frequency among those for movements in X, Y and Z directions.

A scanning probe microscope (SPM) is capable of effecting raster scanning of a probe and a sample relative to each other in XY directions to obtain surface information in a desired sample region through the probe, thus displaying the surface information on a TV monitor in a mapping mode. Further, the SNOM or the like is capable of effecting fine processing by the action of light emitted from a tip of the probe onto a member to be processed or capable of effecting information recording with light. Further, it is also possible to effect fine processing or information recording by forming projections and recesses at a sample surface.

In such an SPM, a scanning mechanism for effecting motion in Z direction by performing feedback control so that an interaction between the sample and probe is constant also in Z direction during XY scanning. The motion in Z direction is, different from regular movement in XY directions, an irregular motion since it reflects a sample shape or sample state of the sample. The Z direction scanning is a motion at a highest frequency among the scannings in XYZ directions. More specifically, the SPM has a scanning frequency of from about 0.05 Hz to about 200 Hz in X direction. A Y direction scanning frequency is about 1/(number of Y direction scanning lines). The number of Y direction scanning lines is 10-1000 lines. Further, a Z direction scanning frequency is from about (X direction scanning frequency)×(number of pixels per one scanning line in X direction) to about 100×(X direction scanning frequency)×(number of pixels per one scanning line in X direction).

For example, when an image of 100 pixels in X direction and 100 pixels in Y direction is acquired in 1 sec. The X direction scanning frequency is 100 Hz, the Y direction scanning frequency is 1 Hz, and the Z direction scanning frequency is 10 kHz or more. Incidentally, the Z direction scanning frequency in this embodiment is a currently most highest-level scanning frequency. The X direction scanning frequency is ordinarily about several Hz. In order to realize the above described higher-level frequencies as in this embodiment, a scanning mechanism therefor is required to be not only stable against external vibration but also suppressed in vibration generated by the scanning mechanism itself during an inner scanning operation.

The present invention is capable of effectively meeting such a requirement.

Hereinbelow, embodiments of the present invention will be described.

Embodiment 1

In Embodiment 1, the present invention is applied so as to constitute a replaceable scanning stage used in a scanning probe apparatus.

Figure 2:
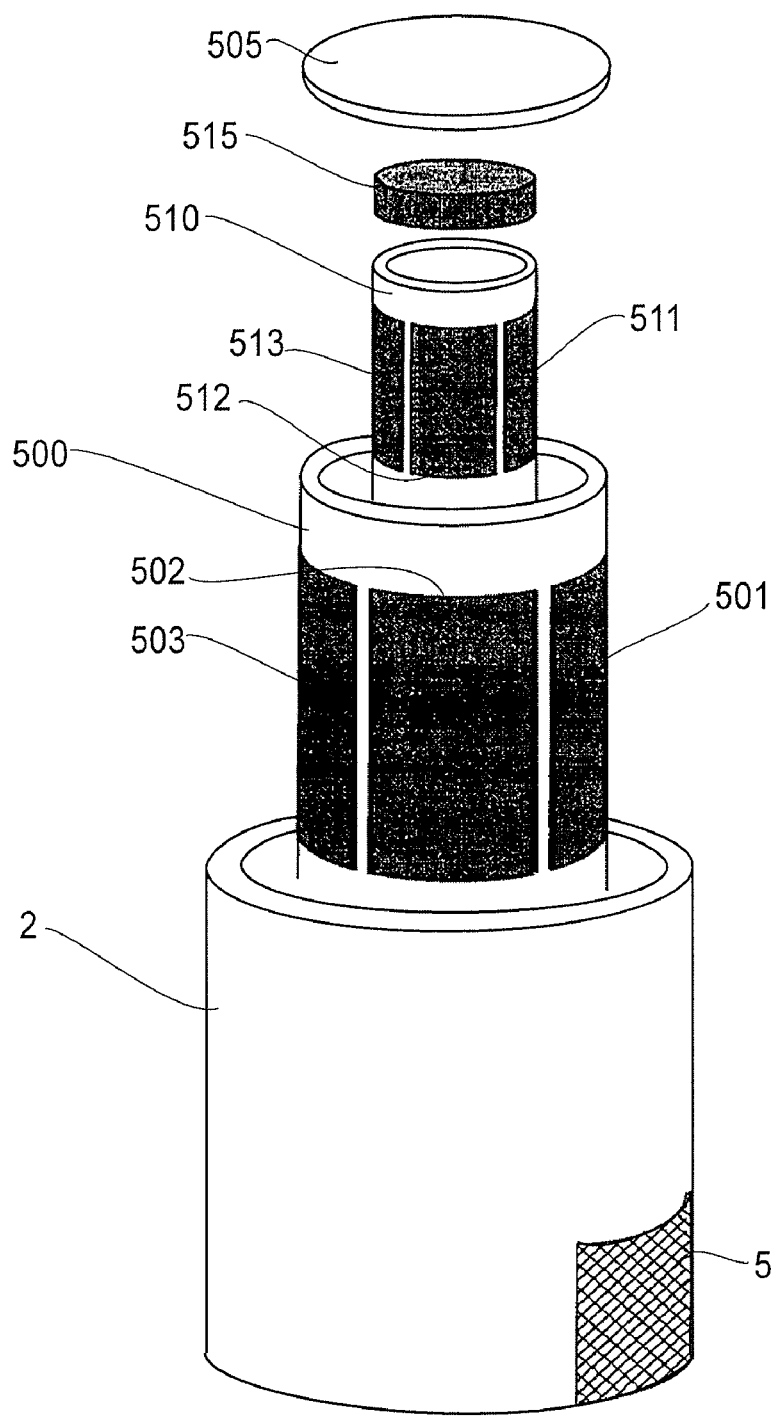
FIG. 2 is a schematic view for illustrating a constitution of the scanning stage used in the scanning probe apparatus in Embodiment 1 of the present invention.

FIG. 1 is a schematic sectional view of a scanning stage which is replaceable with respect to a main assembly of a scanning probe apparatus in this embodiment. FIG. 2 is a schematic view for illustrating the constitution of the scanning stage used in the scanning probe apparatus illustrating the constitution of the scanning stage used in the scanning probe apparatus in this embodiment.

Referring to FIGS. 1 and 2, the scanning probe apparatus includes a recess 1 provided to a main assembly of the scanning probe apparatus; a bottom supporting table 2; an electric connector 3 provided to the bottom supporting table; an electric connector 4, to be connected to the electric connector 3, provided at the recess of the main assembly of the scanning probe apparatus; a memory 5, provided at an outer portion of the bottom supporting table, for storing various characteristic information of the scanning stage; and a communication circuit module 6 provided on the main assembly side of the scanning probe apparatus. Further, the scanning probe apparatus includes a first cylindrical piezoelectric element 500, a movement table 505, a second cylindrical piezoelectric element 510, and a weight 515. The first cylindrical piezoelectric element 500 and the second cylindrical piezoelectric element 510 are disposed concentrically in a cross section in a horizontal direction. In other words, these cylindrical piezoelectric elements 500 and 510 are disposed so that their center axes are aligned with each other.

In this embodiment, the scanning stage is constituted by the bottom supporting table 2, the first cylindrical piezoelectric element 500 which is fixed on the bottom supporting table 2 and provided with the movement table 505, and the second cylindrical piezoelectric element 510 which is fixed on the bottom supporting table 2 and provided with the weight 515. The scanning stage is detachably or replaceably mountable to the main assembly of the scanning probe apparatus so as to be engaged in the recess 1 provided to the main assembly of the scanning probe apparatus.

At a bottom surface of the recess 1, the electric connector 4 is provided and connected to the electric connector 3 provided to the bottom supporting table 2 when the scanning stage is engaged into the recess 1. As a result, a signal for driving the first cylindrical piezoelectric element 500 constituting the scanning piezoelectric element as a drive element for a sample table and the second cylindrical piezoelectric element 510 as a counter piezoelectric element is externally sent.

At an outer portion of the bottom supporting table 2 constituting the scanning stage described above, the memory 5 in which various characteristic information is stored is provided and integrally replaceable, with the scanning stage, from the recess 1 of the main assembly of the scanning probe apparatus.

In this embodiment, the memory 5 is mounted to an IC chip capable of effecting wireless information communication and stores therein characteristic information with respect to the scanning stage. The characteristic information includes calibration or correction information of the scanning piezoelectric element, operation information of the counter piezoelectric element, etc. Examples of the calibration information may include characteristic information such that a distance (nm) of movement of the scanning piezoelectric element in a direction (X, Y or Z direction) when a voltage of 3 volts is applied to the scanning piezoelectric element.

Further, the operation information is information, such as an amount of movement of a counterweight relative to that of the scanning piezoelectric element, for establishing association between both characteristics of the scanning piezoelectric element and the counter piezoelectric element.

On the other hand, the communication circuit module 6 for effecting wireless communication with the IC chip in a non-contact manner is provided on the scanning probe apparatus main assembly side. When the scanning stage is engaged into the recess 1 of the scanning probe apparatus main assembly to turn power of the apparatus main assembly on, the module 6 effect mutual communication with the IC chip to read the characteristic information of the scanning stage.

On the basis of the read characteristic information, the main assembly performs the calibration of the scanning stage, thus permitting accurate scanning. Further, every use of the scanning probe apparatus, usage history information is written in the memory of the IC chip. Thus, on the basis of the characteristic information and the usage history information, the main assembly effects operation control of the scanning stage.

As described above, the scanning piezoelectric element is constituted by the first cylindrical piezoelectric element 500 and an upper (top) portion thereof, a circular plate-like movement table 505 as a sample table is provided.

On the other hand, the counter piezoelectric element is constituted by the second cylindrical piezoelectric element 510 having a smaller diameter than the scanner drive element 500 and the weight 515 as a counterweight is provided at an upper portion of the second cylindrical piezoelectric element 510.

The respective piezoelectric elements are driven in a manner as described in JP-A No. 2000-088983.

Next, a specific constitution of the scanning stage will be described in detail with reference to FIG. 2.

As shown in FIG. 2, the scanning stage in this embodiment includes a drive stage having such a structure that the cylindrical piezoelectric elements are concentrically disposed. More specifically, inside the first cylindrical piezoelectric element 500, the second cylindrical piezoelectric element 510 is concentrically disposed. This state is shown in FIG. 2 as an exploded view. Around the first cylindrical piezoelectric element 500, divided four electrodes 501 to 504 are disposed (in FIG. 2, the electrode 504 is not shown since it is located on a backside), and at an upper portion of the first cylindrical piezoelectric element 500, the movement table 505 is connected. Further, around the second cylindrical piezoelectric element 510, divided four electrodes 511 to 514 are disposed (in FIG. 2, the electrode 514 is not shown), and at an upper portion of the second cylindrical piezoelectric element 510, the weight 515 is connected. The first and second cylindrical piezoelectric elements 500 and 510 can be bent by controlling voltages applied to opposite two electrodes (501 and 503, 502 and 504, 511 and 513, or 512 and 514) so that one of the two electrodes is expanded and the other electrode is contracted. Further, it is also possible to expand and contrast each of the cylindrical piezoelectric elements in a long axis direction by applying the same voltage to the divided four electrodes. In short, the bending and the expansion and contraction of the cylindrical piezoelectric elements 500 and 510 can be controlled by voltages.

Therefore, it is possible to three-dimensionally drive the movement table 505 and the weight 515 disposed at the upper (top) portions of the cylindrical piezoelectric elements.

In the present invention, it is also possible to employ such a constitution that the electrodes 501-504 are used for scannings in X and Y directions and another piezoelectric element is provided for Z axis driving. In this case, the piezoelectric element for Z axis driving is disposed above the electrodes 501-504.

Figure 3:
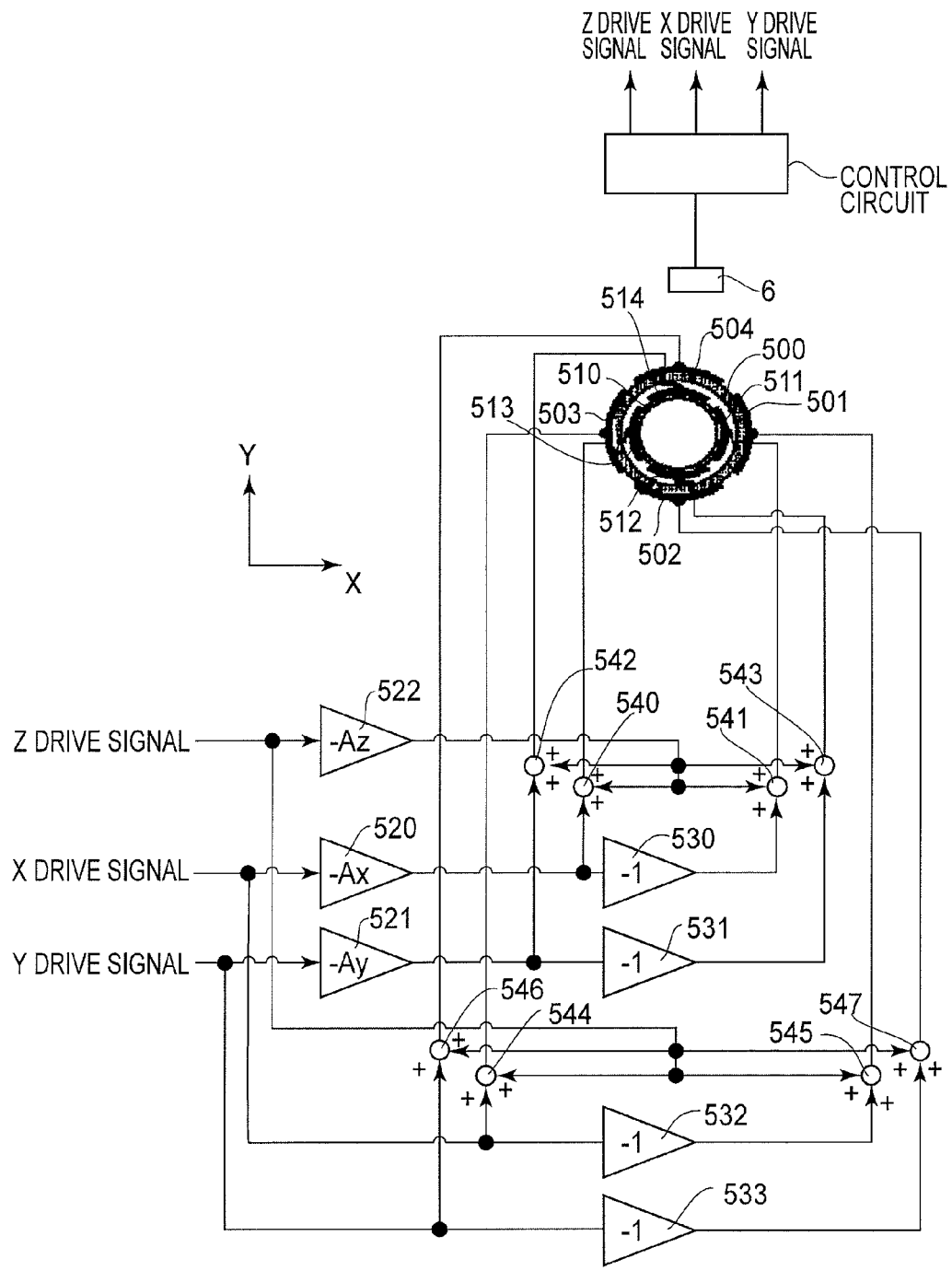
FIG. 3 is a schematic wiring diagram of the scanning stage used in the scanning probe apparatus in Embodiment 1 of the present invention.

FIG. 3 is a wiring diagram for the scanning stage in this embodiment.

Figure 6A:
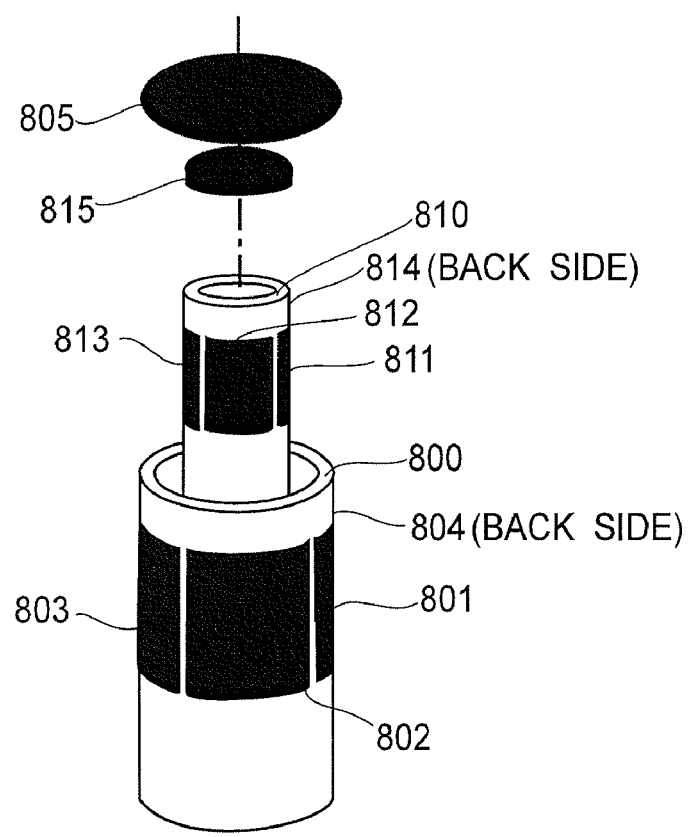
FIGS. 6(a), 6(b) and 6(c) are schematic views for illustrating a drive stage of a conventional SPM described in JP-A No. 2000-088983.
Figure 6C:
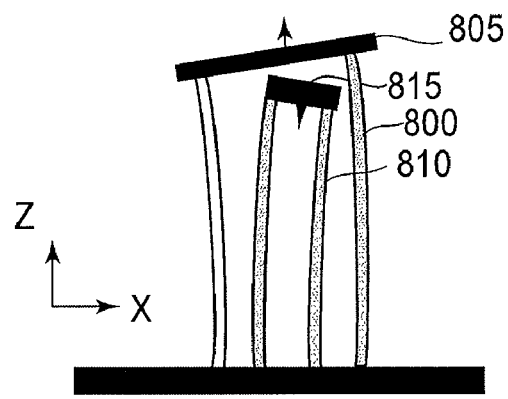
Figure 6B:
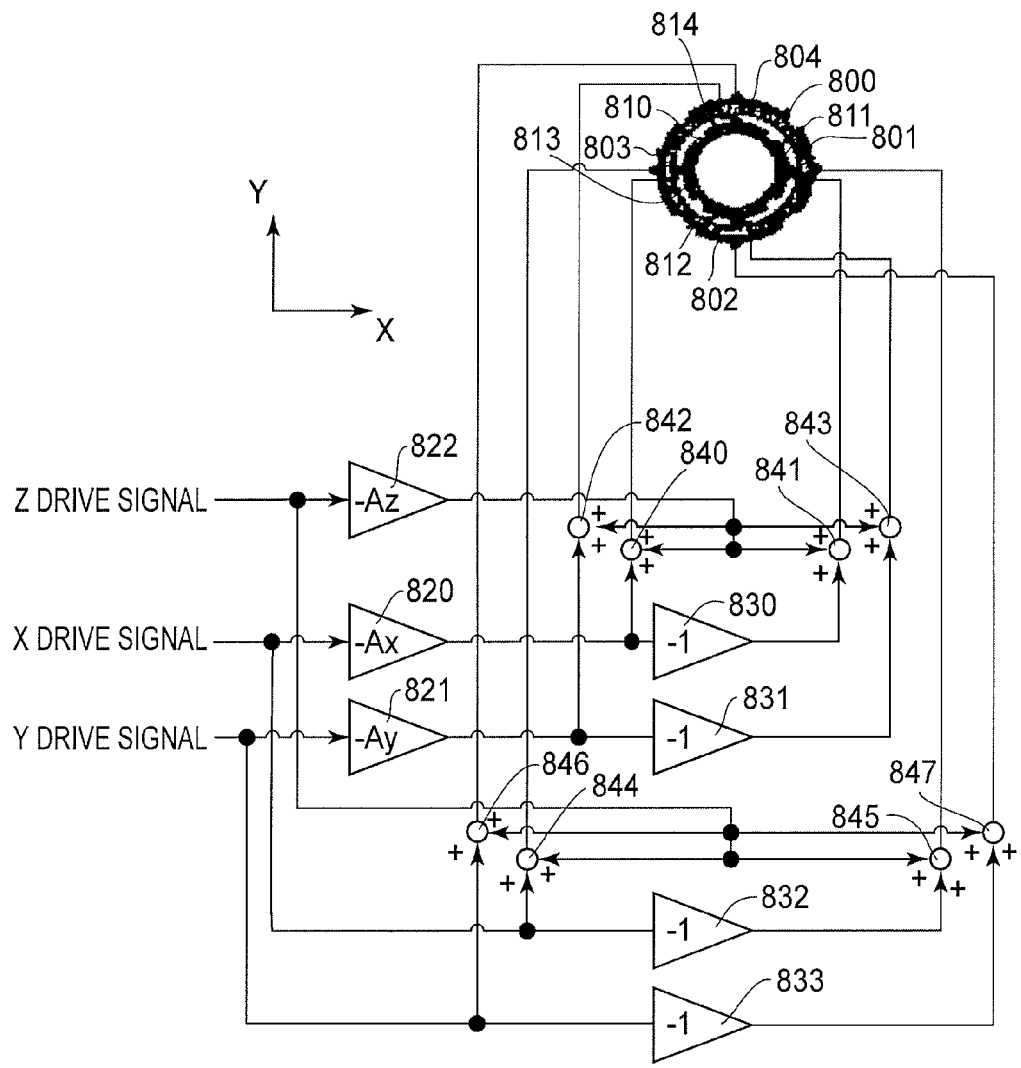

By effecting wiring as shown in FIG. 3, the outer cylindrical piezoelectric element 500 and the inner cylindrical piezoelectric element 510 are always driven in mutually opposite directions. A behavior of deformation of the cylindrical piezoelectric elements in the same as in JP-A No. 2000-088983. Similarly, as in the case of FIG. 6(c), the cylindrical piezoelectric element 500 is bent and expanded toward an upper left direction, the cylindrical piezoelectric element 510 is bent and contracted toward a lower right direction. Gains (amplification factors)–Ax, –Ay, and –Az of amplifiers 520, 521 and 522 are set to cancel inertial forces with respect to the cylindrical piezoelectric elements 500 and 510 in X, Y and Z directions, respectively. Further, these gains may desirably be adjusted to optimum values when a weight of an object to be placed on the movement table is changed.

According to the above described constitution of this embodiment, the outer first cylindrical piezoelectric element 500 and the inner second cylindrical piezoelectric element 510 are always driven so that their inertial forces are cancelled each other. Thus, it is possible to provide a stage with less vibration even when the stage is driven at high speed. In this embodiment, not only the first cylindrical piezoelectric element 500 as the scanning piezoelectric element but also the bottom supporting table 2 on which the scanning piezoelectric element and the counter piezoelectric element for cancelling the inertial forces are fixed are constituted so as to be replaceable from or detachably mountable to the apparatus main assembly. As a result, both of the piezoelectric elements are integrally replaceable.

Accordingly, in the present invention, the above described problem as in the case where only the scanning piezoelectric element is replaced while using the counter piezoelectric element for inertial force cancellation as it is in the conventional scanning probe apparatus is not caused to occur. Further, it is possible to automatically effect the calibration of the scanning stage on the basis of the characteristic information and the usage history information. Thus, even when the scanning probe apparatus is repetitively used while replacing the scanning stage, the inertial forces are always well cancelled, so that it is possible to suppress the vibration.

Incidentally, in this embodiment, the cylindrical piezoelectric elements are used but the present invention is not limited thereto. For example, it is also possible to achieve a similar effect in a case of using three-axis orthogonal piezoelectric elements.

Embodiment 2

In Embodiment 2, a constitution of a scanning probe apparatus including a probe drive stage and a sample stage both of which are provided with a memory will be described. In this embodiment, as the sample stage, a sample stage having the same constitution as that in Embodiment 1 is used.

Further, to the probe drive stage, a basic constitution of the sample stage in Embodiment 1 is also applied so as to constitute such a probe drive stage that it is provided with a drive element for moving a probe holding table and a movable portion for cancelling inertial force generated during movement of the probe holding table. Further, the probe drive stage is constituted so that the movable portion and the drive element including the probe holding stage are integrally replaceable from the main assembly of the scanning probe apparatus.

Figure 4:
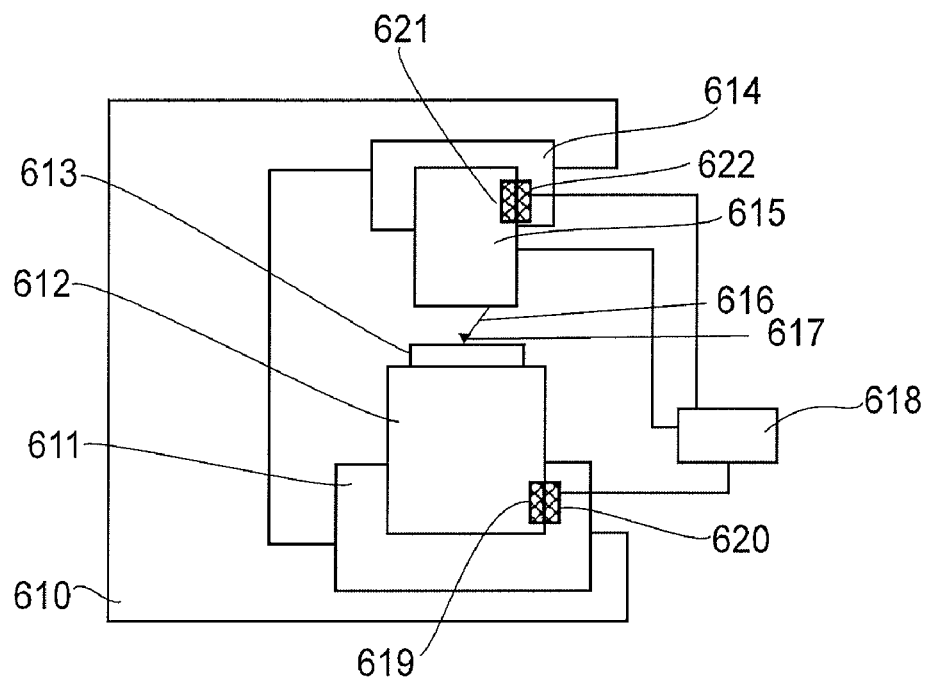
FIG. 4 is a schematic view for illustrating an embodiment of a constitution of a scanning probe apparatus including a probe drive stage and a sample stage both of which are provided with a memory in Embodiment 2 of the present invention.
Figure 5:
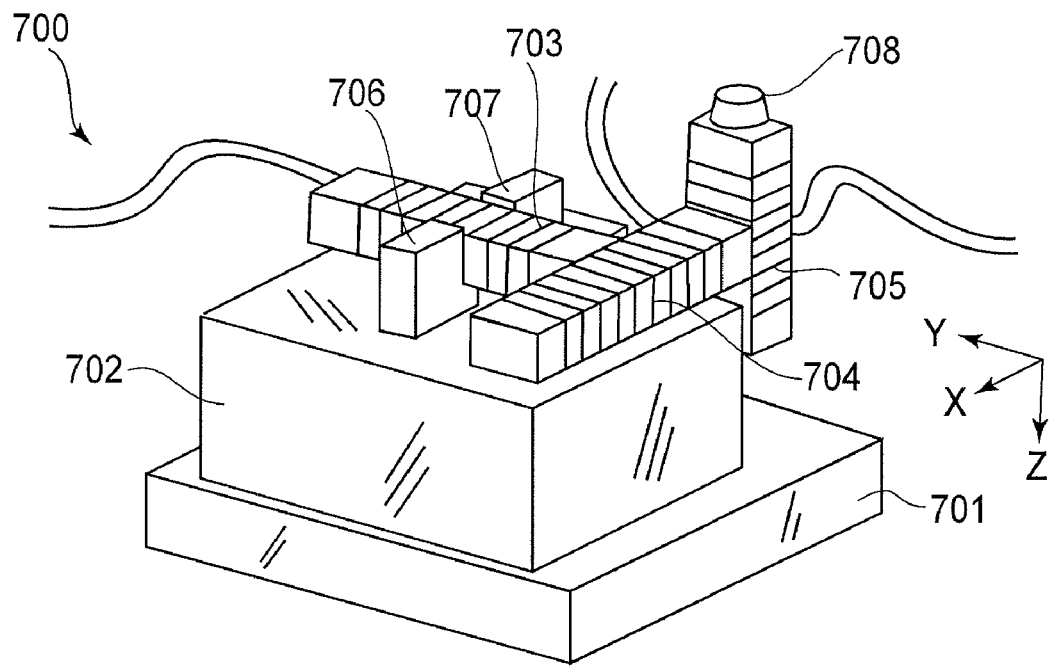
FIG. 5 is a schematic view for illustrating a scanning mechanism for a conventional scanning probe microscope (SPM) described in JP-A No. 2002-082036.

FIG. 4 is a schematic view for illustrating a constitution of the scanning probe apparatus in this embodiment.

Referring to FIG. 4, the scanning probe apparatus includes a scanning probe apparatus main assembly 610; a sample stage supporting portion 611 having an engaging recess in the scanning probe apparatus main assembly; a bottom base table 612 of sample stage; a sample 613 mounted on the sample stage; a probe drive stage supporting portion 614 having an engaging recess in the scanning probe apparatus main assembly; a bottom base table 615 of probe drive stage; a scanning probe 616; a probe 617; a control computer 618 for controlling the entire scanning probe apparatus; a memory 619, provided at an outer portion of the sample stage bottom base table 612, for storing various characteristic information of the scanning stage; a communication circuit module 620 provided on the apparatus main assembly side; a memory 621, provided at an outer portion of the drive stage bottom base table 615, for storing various characteristic information of the probe drive stage; and a communication circuit module 622 provided on the apparatus main assembly side. Each of these memories 619 and 621 is mounted to an IC chip capable of effecting wireless communication similarly as in Embodiment 1. In the memory 619, the characteristic information of the scanning stage is stored. In the memory 621, the characteristic information of the probe drive stage is stored.

In the above described constitution of this embodiment, both of the stages each including the inertial force cancelling piezoelectric element are constituted so as to be integrally replaceable together with the inertial force cancelling piezoelectric elements. Such a replaceable constitution is basically similar to that in Embodiment 1. In this case, through electric connectors (not shown) provided to the respective members, these members are constituted so as to be electrically connected to each other. In this regard, a constitution similar to that in Embodiment 1 is also basically employed in this embodiment.

When power of the apparatus main assembly is turned on, the communication circuit modules 619 and 621 provided on the apparatus main assembly side and the IC chips including the memories 620 and 620 communicate with each other, so that each of calibrations is performed on the basis of associated characteristic information. Further, usage history information is updated every use of the scanning probe apparatus.

Operation control on the basis of the characteristic information and usage history information is effected in a basically similar manner as in Embodiment 1.

According to the constitution of this embodiment, during replacement of the probe drive stage or the scanning stage, it is possible to automatically effect calibration of an associate stage on the basis of the characteristic information and the usage history information.

Thus, even when the scanning probe apparatus is repetitively used the inertial forces are always well cancelled, so that it is possible to suppress the vibration.

The scanning prove apparatus according to the present invention is suitably used as not only the above described microscope for obtaining information of a sample but also an information recording apparatus for recording information in a recording material as a sample by bringing the probe close to the recording material and passing current between the recording material and the probe to change a state of the recording material in a minute area and a processing apparatus for processing a sample by bringing the probe close to the sample and passing current between the sample and the probe.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 024712/2006 filed Feb. 1, 2006, which is hereby incorporated by reference.

What is claimed is:

1. A scanning probe apparatus for obtaining information of a sample, recording information in the sample, or processing the sample, the apparatus comprising:

a probe; and a scanning stage for moving the sample relative to the probe, wherein the scanning stage comprises:

a sample holding table for holding the sample;

a scanning piezoelectric element for moving the sample holding table;

a movable portion, comprising a counterweight and a counter piezoelectric element, movable in a direction in which an inertial force generated during movement of the sample holding table is canceled; and a memory, storing calibration information of the scanning piezoelectric element and operation information for establishing association between characteristics of the scanning piezoelectric element and the counter piezoelectric element, for writing therein usage history information of the scanning probe apparatus, and wherein the sample holding table, the scanning piezoelectric element, the movable portion, and the memory are detachably or replaceably mountable to a main assembly of the scanning probe apparatus.

2. An apparatus according to claim 1, wherein the apparatus further comprises communication means, on its main assembly side, for receiving the calibration information of the scanning piezoelectric element and operation information of the scanning stage stored in the memory in a noncontact manner, and wherein drive of the scanning stage is controlled on a basis of the calibration information of the scanning piezoelectric element and operation information received by the communication means.

3. An apparatus according to claim 1, wherein a first cylindrical piezoelectric element constitutes the scanning piezoelectric element, and a second cylindrical piezoelectric element constitutes the counter piezoelectric element and is disposed inside the first cylindrical piezoelectric element.

4. A scanning probe apparatus for obtaining information of a sample, recording information in the sample, or processing the sample, the apparatus comprising:

a sample stage for holding the sample; and a probe driving stage for moving the probe relative to the sample, wherein the probe driving stage comprises:

a probe holding table for holding the probe;

a scanning piezoelectric element for moving the probe holding table;

a movable portion, comprising a counterweight and a counter piezoelectric element, movable in a direction in which an inertial force generated during movement of the probe holding table is canceled; and a memory, storing calibration information of the scanning piezoelectric element and operation information for establishing association between characteristics of the scanning piezoelectric element and the counter piezoelectric element, for writing therein usage history information of the scanning probe apparatus, and wherein the probe holding table, the scanning piezoelectric element, the movable portion, and the memory are detachably or replaceably mountable to a main assembly of the scanning probe apparatus.

5. An apparatus according to claim 4, wherein the apparatus further comprises communication means, on its main assembly side, for receiving the calibration information of the scanning piezoelectric element and operation information of the probe drive stage stored in the memory in a noncontact manner, and wherein drive of the scanning stage is controlled on a basis of the calibration information of the scanning piezoelectric element and operation information received by the communication means.

6. An apparatus according to claim 4, wherein a first cylindrical piezoelectric element constitutes the scanning piezoelectric element, and a second cylindrical piezoelectric element constitutes the counter piezoelectric element and is disposed inside the first cylindrical piezoelectric element.

7. A stage, for a scanning probe apparatus for obtaining information of a sample, recording information in the sample, or processing the sample, for performing relative movement between the sample and a probe, the stage comprising:

a holding table for holding the sample or the probe;

a scanning piezoelectric element for moving the holding table;

a movable portion, comprising a counterweight and a counter piezoelectric element, movable in a direction in which an inertial force generated during movement of the holding table is canceled; and a memory, storing calibration information of the scanning piezoelectric element and operation information for establishing association between characteristics of the scanning piezoelectric element and the counter piezoelectric element, for writing therein usage history information of the scanning probe apparatus, and wherein the holding table, the scanning piezoelectric element, the movable portion, and the memory are detachably or replaceably mountable to a main assembly of the scanning probe apparatus.

* * * * *